US009588997B2

(12) United States Patent
Hui et al.

(10) Patent No.: US 9,588,997 B2
(45) Date of Patent: *Mar. 7, 2017

(54) MODULARIZING COMPLEX XML DATA FOR GENERATION AND EXTRACTION

(71) Applicant: International Business Machines Corporation, Armonk, NY (US)

(72) Inventors: Joshua W. Hui, San Jose, CA (US); Sarah E. Knoop, San Jose, CA (US); Peter M. Schwarz, San Jose, CA (US); John T. Timm, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 14/022,410

(22) Filed: Sep. 10, 2013

(65) Prior Publication Data
US 2014/0304305 A1 Oct. 9, 2014

Related U.S. Application Data

(63) Continuation of application No. 13/858,402, filed on Apr. 8, 2013, now Pat. No. 9,047,325.

(51) Int. Cl.
*G06F 17/30* (2006.01)

(52) U.S. Cl.
CPC .. *G06F 17/30294* (2013.01); *G06F 17/30914* (2013.01)

(58) Field of Classification Search
USPC .................................................. 707/803, 752
See application file for complete search history.

(56) References Cited

U.S. PATENT DOCUMENTS 5,274,805 A * 12/1993 Ferguson .................. G06F 7/24
5,579,514 A * 11/1996 Turek ........................ G06F 7/24
(Continued)

OTHER PUBLICATIONS

3M Health Information Systems, "Using a Medical Data Dictionary to Comply with Vocabulary Standards and Exchange Clinical Data," http:www.nghealthcarepayers.com/media/whitepapers/3M_NGHUS.pdf; product information sheet for 3M's Healthcare Data Dictionary; Mar. 2010; 12 pages.
(Continued)

*Primary Examiner* — Hosain Alam
*Assistant Examiner* — Ahmed Abraham
(74) *Attorney, Agent, or Firm* — Cantor Colburn LLP

(57) ABSTRACT

A mechanism is provided for creating modules from an XML schema. The mechanism includes creating a syntax tree from a sample XML fragment of the XML schema, creating a module with a list of parameters based on the syntax tree, identifying variable pieces of information in the syntax tree to be inserted in the list of parameters with a variable sign, and inserting the variable information into the list of parameters. The mechanism includes inserting another module in the syntax tree of the module, in which the other module corresponds to another sample XML fragment and has another list of parameters, and identifying the other module with the variable sign in the syntax tree of the module. The mechanism includes inserting the other module into the list of parameters of the module in which the other module to serve as a parameter, and providing an option for constraining the module.

5 Claims, 21 Drawing Sheets

(56) References Cited

U.S. PATENT DOCUMENTS

| | | | | |
|---|---|---|---|---|
| 5,619,713 | A * | 4/1997 | Baum | G06F 15/78 |
| 6,330,559 | B1 * | 12/2001 | Azuma | G06F 7/36 |
| 6,891,834 | B1 * | 5/2005 | Dally | H04L 12/5693 |
| | | | | 370/395.4 |
| 7,694,284 | B2 * | 4/2010 | Berg | G06F 8/36 |
| | | | | 717/137 |
| 7,761,844 | B2 * | 7/2010 | Bove | G06F 8/36 |
| | | | | 707/829 |
| 8,135,747 | B2 * | 3/2012 | Anzalone | G06F 17/30592 |
| | | | | 707/791 |
| 8,185,867 | B2 * | 5/2012 | Robinson | G06F 8/00 |
| | | | | 717/105 |
| 8,244,718 | B2 * | 8/2012 | Chamdani | G06F 17/30442 |
| | | | | 707/718 |
| 2002/0078023 | A1 * | 6/2002 | Lawton | G06F 17/30864 |
| 2008/0097974 | A1 * | 4/2008 | Chen | G06F 17/30926 |
| 2008/0189252 | A1 * | 8/2008 | Branscome | G06F 17/30442 |
| 2008/0238376 | A1 | 10/2008 | Zolfaghari | |
| 2009/0132638 | A1 * | 5/2009 | Kim | G06F 9/5044 |
| | | | | 709/202 |
| 2010/0042624 | A1 * | 2/2010 | Min | G06F 17/30607 |
| 2010/0185954 | A1 * | 7/2010 | Simernitski | G06Q 10/06 |
| | | | | 715/751 |
| 2012/0017126 | A1 * | 1/2012 | Yamano | G06F 11/0733 |
| | | | | 714/48 |
| 2012/0047126 | A1 * | 2/2012 | Branscome | G06F 17/30519 |
| | | | | 707/714 |
| 2012/0124055 | A1 * | 5/2012 | Deubel | G06F 17/30722 |
| | | | | 707/741 |
| 2012/0124070 | A1 * | 5/2012 | Mishra | G06F 17/3097 |
| | | | | 707/767 |
| 2012/0136875 | A1 * | 5/2012 | Pan | G06F 17/30902 |
| | | | | 707/748 |
| 2012/0246156 | A1 * | 9/2012 | Gupta | G06F 17/3053 |
| | | | | 707/731 |
| 2012/0246170 | A1 * | 9/2012 | Iantorno | G06F 8/77 |
| | | | | 707/748 |
| 2012/0278339 | A1 * | 11/2012 | Wang | G06F 17/30241 |
| | | | | 707/748 |
| 2013/0282687 | A1 * | 10/2013 | Ah-Pine | G06F 17/30023 |
| | | | | 707/706 |
| 2013/0290377 | A1 | 10/2013 | Purohit | |
| 2013/0304769 | A1 | 11/2013 | Nicola et al. | |

OTHER PUBLICATIONS

U.S. Appl. No. 13/180,790, filed Jul. 12, 2011; First Named Inventor: Batavia Holly Connor.

Coyle, et al., "Clinical Element Model," http://intermounainhealthcare.org/CEM; Nov. 14, 2008; GE/Intermountain Health Clinical Element model approach; 16 pages.

Cartledge et al., "XML Mapping in WebSphere Integration Developer V7, Part 1: Using the Mapping Editor to Develop Maps," http://www.ibm.com/developerworks/websphere/library/techarticles/1003_spriet1/1003_spriet1.html; IBM Graphical Data Mapper (formerly Mapping Specification Language); Mar. 24, 2010; 17 pages.

Cartledge et al., "XML Mapping in WebSphere Integration Developer V7, Part 2: Working with Complex XML Structures," http://www.ibm.com/developerworks/websphere/library/techarticles/1003_spriet2/1003_spriet2.html; IBM Graphical Data Mapper (formerly Mapping Specification Language); Mar. 24, 2010; 23 pages.

Waldt, D., "Six Strategies for Extending XML Schemas in a Single Namespace," IBM, Developer Works, Jan. 19, 2010, pp. 1-11.

* cited by examiner

```
</enrty>
<entry typeCode="DRIV"/>
  <observation classCode="OBS" moodCode="EVN">
    <templateId root="2.16.840.1.113883.10.20.1.31"/> <!-- Result observation template -->
    <id root="c6f88322-67ad-11db-bd13-0800200c9a66"/>
    <code code="27113001"
      codeSystem="2.16.840.1.113883.6.96"
      displayName="Body weight"/>
    <statusCode code="completed"/>
    <effectiveTime value="19991114"/>
    <value xsi:type="PQ"
      Value="86"
      unit="kg"/>
  </observation>
</entry>
<entry typeCode="DRIV"/>
```

Module — 180

General Information — 204

| Name: | Weight |

Derived from:

Target Namespace

| Namespace Prefix: | Weight |
| Namespace URI: | http://abc.com/weight |

Namespace Prefix Mapping

| Prefix | Namespace URI |
|---|---|
| <default> | urn:hl7-org:v3 |
| xsi | http://www.w3.org/2001/XMLSchema-instance |

Syntax Tree — 205

Search:

| Name | Value / Expression |
|---|---|
| ▲ ⓔ entry — 202 | --- |
|   ⓐ typeCode | DRIV |
|   ▲ ⓔ observation — 203 | --- |
|     ⓐ classCode | OBS |
|     ⓐ moodCode | EVN |
|     ▲ ⓔ templateId | --- |
|       ⓐ root | 2.16.840.1.113883.10.20.1.31 |
|     ▲ ⓔ id | --- |
|       ⓐ root | c6f88322-67ad-11db-bd13-0800200c9a66 |
|     ▲ ⓔ code | --- |
|       ⓐ code | 27113001 |
|       ⓐ codeSystem | 2.16.840.1.113883.6.96 |
|       ⓐ displayName | Body weight |
|     ▲ ⓔ statusCode | --- |
|       ⓐ code | completed |
|     ▲ ⓔ effectiveTime | --- |
|       ⓐ value | --- |
|     ▲ ⓔ value | --- |
|       ⓐ unit | --- |
|       ⓐ xsi:type | PQ |

Next

Parameters — 206

A list of parameters used in the module

| Name | Required? | Repeat? | Nillable? | Simple Type | Fixed value |
|---|---|---|---|---|---|
| ⓒ Weight | --- | --- | false | --- | --- |
|   ⓢ time | --- | --- | false | string | --- |
|   ⓢ value | --- | --- | false | string | --- |
|   ⓢ unit | true | true | false | string | --- |

FIG. 2D

Module

General Information
Name: VitalSignsSection

Derived from:

Target Namespace

Namespace Prefix: vss

Namespace URI: http://www.research.ibm.com/xml/module/VitalSignsSection

Namespace Prefix Mapping — 206

| Prefix | Namespace URI |
|---|---|
| <default> | urn:hl7-org:v3 |
| xsi | http://www.w3.org/2001/XMLSchema-instance |

Parameters
A list of parameters used in the module

| Name | Required? | Repeat? | Nillable? | Simple Type | Fixed value |
|---|---|---|---|---|---|

Syntax Tree — 204

Search:

| Name | Value / Expression | Matching Criteria for Ex... |
|---|---|---|
| ▲ [e] component | --- | |
| ▲ [e] section — 202 | --- | — 205 |
| @= classCode | DOCSECT | |
| @= moodCode | EVN | |
| ▲ [e] templateId | --- | |
| @= root | 2.16.840.1.113883.10.20.1.16 | |
| ▲ [e] code | --- | |
| @= code | 8716-3 | |
| @= codeSystem | 2.16.840.1.113883.6.1 | |
| ▲ [e] title | Vital signs | |
| @= mediaType | text/plain | |
| @= representation | TXT | |
| ▲ [e] text | --- | |

180

Next

Figure 2F:
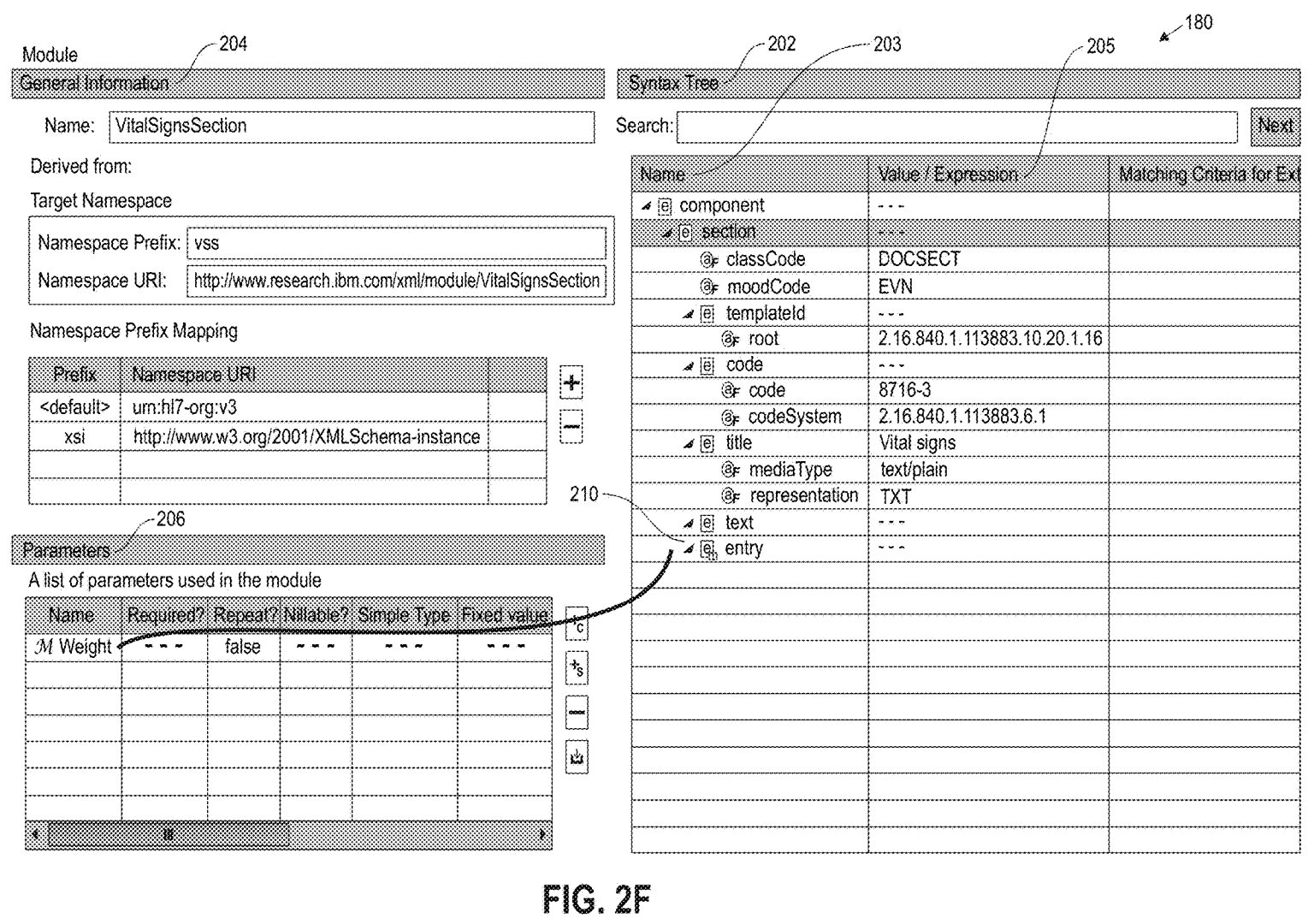

Module

General Information

Name: VitalSignsSection — 204

Derived from:

Target Namespace

Namespace Prefix: vss

Namespace URI: http://www.research.ibm.com/xml/module/VitalSignsSection

Namespace Prefix Mapping

| Prefix | Namespace URI |
|---|---|
| <default> | urn:hl7-org:v3 |
| xsi | http://www.w3.org/2001/XMLSchema-instance |

— 206

Parameters — 210

A list of parameters used in the module

| Name | Required? | Repeat? | Nillable? | Simple Type | Fixed value |
|---|---|---|---|---|---|
| M Weight | --- | false | --- | --- | --- |

Syntax Tree — 202, 203, 205

Search:

| Name | Value / Expression | Matching Criteria for Ext |
|---|---|---|
| ▸ ⓔ component | --- | |
| ▾ ⓔ section | --- | |
|   @ classCode | DOCSECT | |
|   @ moodCode | EVN | |
|   ▸ ⓔ templateId | --- | |
|   ▾ ⓔ code | | |
|     @ root | 2.16.840.1.113883.10.20.1.16 | |
|     @ code | 8716-3 | |
|     @ codeSystem | 2.16.840.1.113883.6.1 | |
|   ▸ ⓔ title | Vital signs | |
|     @ mediaType | text/plain | |
|     @ representation | TXT | |
|   ▸ ⓔ text | --- | |
|   ▸ ⓔ entry | --- | |

Next

— 180

Module

General Information

Name: VitalSignsSection

Derived from:

Target Namespace

Namespace Prefix: vss

Namespace URI: http://www.research.ibm.com/xml/module/VitalSignsSection

Namespace Prefix Mapping

| Prefix | Namespace URI |
|---|---|
| <default> | urn:hl7-org:v3 |
| xsi | http://www.w3.org/2001/XMLSchema-instance |

Syntax Tree

Search:

| Name | Value / Expression | Matching Criteria for Ex |
|---|---|---|
| component | --- | |
| section | --- | |
| @ classCode | DOCSECT | |
| @ moodCode | EVN | |
| @ templateId | --- | |
| @ root | 2.16.840.1.113883.10.20.1.16 | |
| code | --- | |
| @ code | 8716-3 | |
| @ codeSystem | 2.16.840.1.113883.6.1 | |
| title | Vital signs | |
| @ mediaType | text/plain | |
| @ representation | TXT | |
| text | --- | |
| entry | --- | |
| entry | --- | |

Next

Parameters

A list of parameters used in the module

| Name | Required? | Repeat? | Nillable? | Simple Type | Fixed value |
|---|---|---|---|---|---|
| M Weight | --- | false | --- | --- | --- |
| M BloodPressure | --- | false | --- | --- | --- |

FIG. 2G

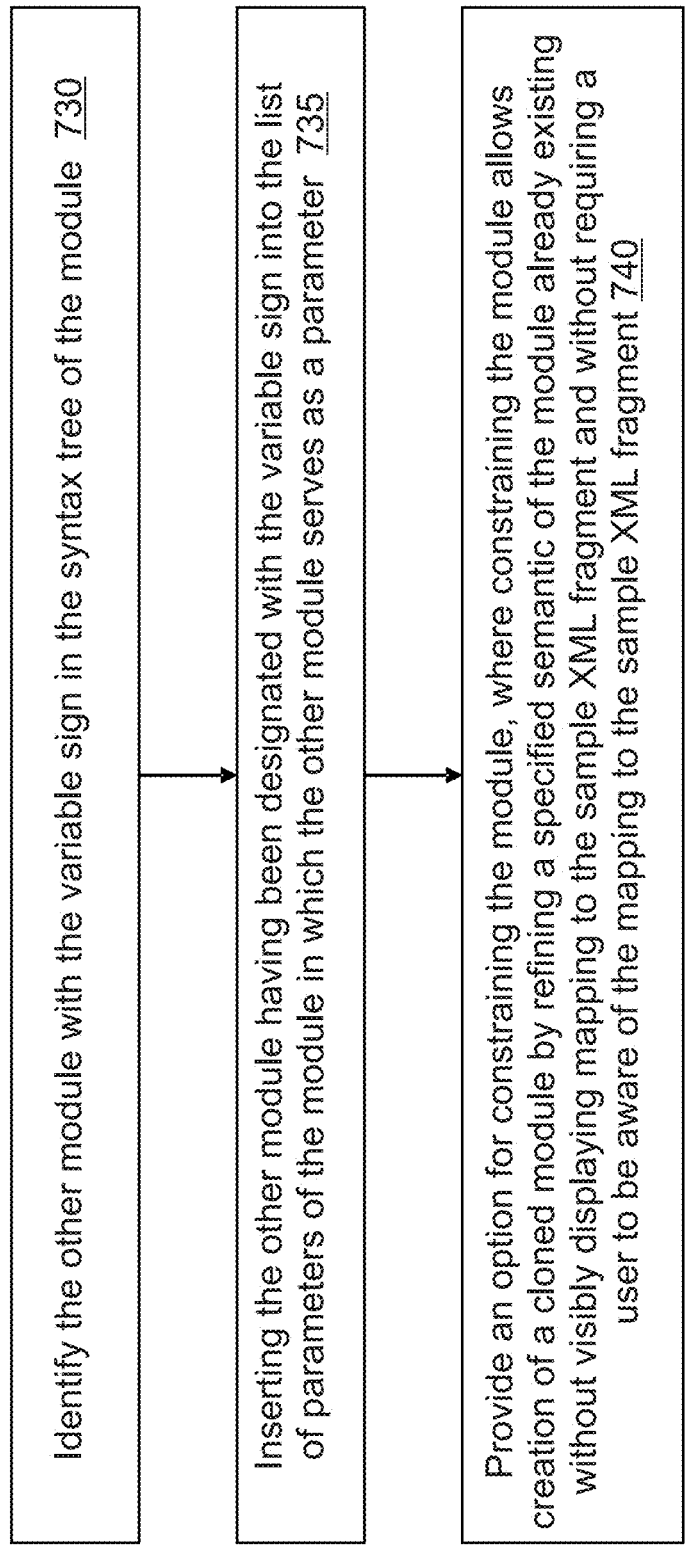

Algorithm to generate a simplified schema:

```
-- BEGIN: schema generator
input : module M
output : schema S let root := root complex parameter of M for each parameter in M
    if parameter is defined elsewhere then
        generate import or include statement
    end if
end for generate complex type definition in S for root for each child parameter of root
    if paramater is simple parameter then
        generate element or attribute in S with simple XML schema type
    else if parameter is module parameter then
        generate element in S typed to root complex parameter in source module
    end if
end for
-- END: schema generator
```

FIG. 8

Algorithm to generate the expand transform:

```
-- BEGIN: expand transform generator
input : module M
output : transform T generate template in T for module M for each parameter in M
    if M has root simple parameter
        define parameter in T
    else if M has root complex parameter then
        for each child of root complex parameter
            define parameter in T
        end for
    else if M has module parameters then
        for each module parameter in M
            define parameter in T
        end for
    end if
end for for each node in syntax tree (depth-first traversal)
    if node is element then
        if node has condition then
            generate "if" element in T
        end if
```

Algorithm to generate the expand transform:

```
if node is fixed node then
        generate XML element
    else if node is variable node then
        generate "value-of" element in T
        generate "select" expression from parameter
definition in T
    else if node is derived node then
        generate "value-of" element in T
        set "select" expression to expression on derived
node
    else if node is module node then
        generate "call-template" element in T
        if target module has root complex parameter
then
            generate "for-each" element in T
        end if
    end if
end if
```

Algorithm to generate the expand transform:
```
add node to parent in T
   else if node is attribute then
      if node has condition then
         generate "if" element in T
      end if if node is fixed node then
         generate XML attribute add to parent node in T
      else if node is variable node then
         generate "value-of" element in T
         generate "select" expression from parameter
definition in T
      else if node is derived node then
         generate "value-of" element in T
         set "select" expression to expression on derived
node
      else if add node to parent in T
   end if
end for
-- END: expand transform generator
```

Algorithm to generate the extract transform:

-- BEGIN: extract transform generator
input : module M
output : transform T let root := root complex parameter of M generate complex type definition in S for root for each child parameter of root
   if parameter is simple parameter then
      generate XML element in T
      generate "value-of" element in T
      generate "select" expression through recursive traversal of syntax tree using match criteria nodes in generated predicates
   else if parameter is module parameter then
      generate "call-template" element in T that references template generated for target module
   end if
   add element to parent in T
end for
-- END: extract transform generator

FIG. 10

MODULARIZING COMPLEX XML DATA FOR GENERATION AND EXTRACTION

CROSS REFERENCE TO RELATED APPLICATIONS

The present application is a continuation of U.S. patent application Ser. No. 13/858,402, entitled "MODULARIZING COMPLEX XML DATA FOR GENERATION AND EXTRACTION", filed on Apr. 8, 2013, which is incorporated herein by reference in its entirety.

BACKGROUND

The present disclosure relates to simplifying a large original XML model (e.g., a hierarchical data model) into a simpler XML model, and more specifically, a software tool for creating and manipulating modules.

Extensible markup language (XML) is a markup language that defines a set of rules for encoding documents in a format that is both human-readable and machine-readable. It is defined in the XML 1.0 Specification produced by the W3C, and several other related specifications, which are all gratis open standards.

XML includes or may be described with the following:

(Unicode) character: By definition, an XML document is a string of characters. Almost every legal Unicode character may appear in an XML document.

Processor and application: The processor analyzes the markup and passes structured information to an application. The specification places requirements on what an XML processor must do and not do, but the application is outside its scope. The processor (as the specification calls it) is often referred to colloquially as an XML parser.

Markup and content: The characters making up an XML document are divided into markup and content, which may be distinguished by the application of simple syntactic rules. Generally, strings that constitute markup either begin with the character < and end with a >, or they begin with the character & and end with a ;. Strings of characters that are not markup are content. In addition, whitespace before and after the outermost element is classified as markup.

Tag: A markup construct that begins with < and ends with >. Tags come in three types: start-tags, for example: <section>; end-tags, for example: </section>; empty-element tags, for example: <line-break />.

Element: A logical document component either begins with a start-tag and ends with a matching end-tag or consists only of an empty-element tag. The characters between the start- and end-tags, if any, are the element's content, and may contain markup, including other elements, which are called child elements.

Attribute: A markup construct consisting of a name/value pair that exists within a start-tag or empty-element tag.

XML is a textual data format with strong support via Unicode for the languages of the world. Although the design of XML focuses on documents, it is widely used for the representation of arbitrary data structures, for example in web services. Many application programming interfaces (APIs) have been developed to aid software developers with processing XML data, and several schema systems exist to aid in the definition of XML-based languages.

An XML schema is a description of a type of XML document, typically expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints.

SUMMARY

According to an embodiment, an apparatus for creating modules from an XML schema is provided. The operations performed by a processor include creating a syntax tree from a sample XML fragment, where the sample XML fragment is an instance of a sample fragment of the XML schema, and creating a module based on the syntax tree of the sample XML fragment. The module includes a list of parameters and the syntax tree. The operations include identifying, on a computer, variable pieces of information in the syntax tree to be inserted in the list of parameters by designating the variable pieces of information with a variable sign, inserting the variable pieces of information into the list of parameters of the module based on the variable pieces of information being designated with the variable sign, and inserting another module in the syntax tree of the module. The other module corresponds to another sample XML fragment of the XML schema and has another list of parameters. The operations include identifying the other module with the variable sign in the syntax tree of the module, inserting the other module designated with the variable sign into the list of parameters of the module in which the other module serves as a parameter, and providing an option for constraining the module. Constraining the module allows creation of a cloned module by refining the list of parameters of the module already existing without visibly displaying mapping to the sample XML fragment and without requiring a user to be aware of the mapping to the sample XML fragment.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 2A, 2B, 2C, 2D, 2E, 2F, 2G, and 2H illustrate specific examples of utilizing a software tool to create and configure modules according to an embodiment.

FIGS. 7A and 7B illustrate a method of creating modules from a complex extensible markup language schema according to an embodiment.

FIG. 8 illustrates an example of an algorithm to generate a simplified schema according to an embodiment.

FIGS. 9A, 9B, and 9C illustrate an example of an algorithm to generate the expand transform according to an embodiment.

FIG. 10 illustrates an example of an algorithm to generate the extract transform according to an embodiment.

DETAILED DESCRIPTION

Figure 1:
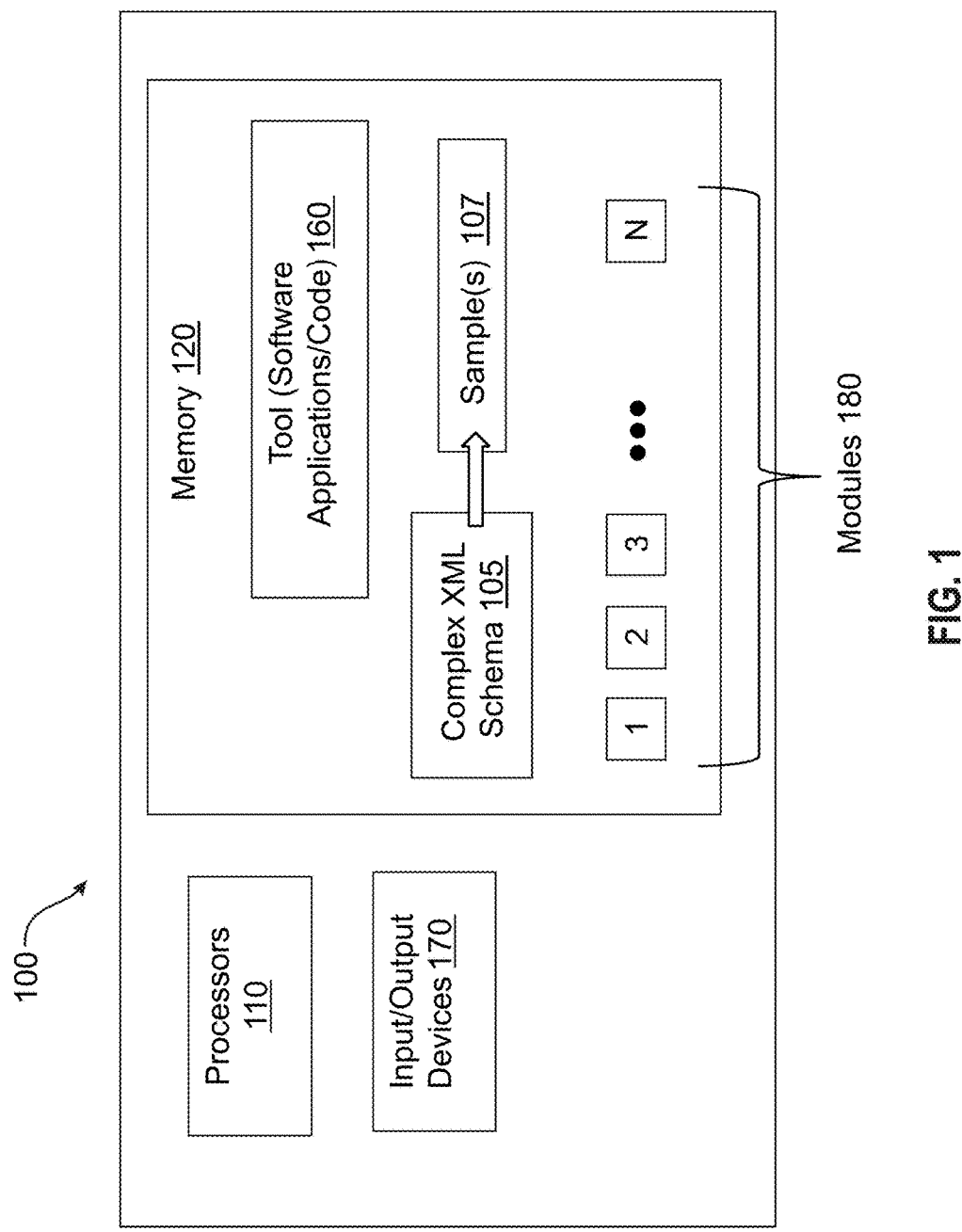
FIG. 1 illustrates a computer system for creating and configuring modules according to an embodiment.

Many industries need to produce and exchange complicated information. For example, in healthcare, one might need to transmit the discharge summary for a patient's two week stay in the hospital from one institution to another. Standards that use XML documents to represent such information are common because XML offers great flexibility, is platform neutral and is widely adopted. XML permits information to be placed in a strict context based on a high level data model, and standard terminologies (e.g., in healthcare, standards such as SNOMED CT (Systematized Nomenclature of Medicine Clinical Terms), ICD9 (International Classification of Diseases), etc.) can be used to give the model's elements precise semantics.

However, the information that clients need to convey is not originally produced in a semantically rich XML format. Rather, the information lies in heterogeneous relational and legacy-format databases and in textual or multi-media documents. Due to the diverse nature of the original systems and technologies used to produce the data (examples from healthcare include EMRs (electronic medical record), PACS (picture archiving and communication system), HIS (hospital information system), LIS (laboratory information system), etc.), it is often the case that the information held within them needs to go through additional computational processing to be identified and used. For example, a text document detailing a hospital stay might list numerous medications. In order to put this information into the standard XML format, each medication would first need to be correctly identified in the text and assigned an appropriate medical code. The end result of this process is typically a set of small snippets of information, collected from many sources and represented as simply as possible, that must be placed into context and assembled into a coherent whole that complies with the XML standard. A similar problem exists when consuming standard-compliant documents. Analytic tools typically operate on data in a relational format and are less capable of directly integrating data in complex XML formats. If a data scientist or developer knows that all they are looking for out of a set of documents is information about medications, a set of simple objects describing each medication is preferable to a complex XML document, as discussed in embodiment.

Creating custom code to produce or decompose complex XML documents can be very laborious, across different client environments. On the other hand, generating code automatically from standard XML schemas results in APIs that are difficult to use and as difficult to wade through as the original standards. One can quickly be overwhelmed by a standard's breadth and expressiveness and lose precious development time. However, embodiments provide a methodology and a technology that together modularize this data mapping problem and make it easier to focus on the data of interest (e.g., medications), and to build up a bidirectional mapping between individual snippets of information (e.g., simplified schemas respectively corresponding to modules) and complete documents (e.g., large complex XML schema) by using reusable components called modules.

One conventional approach is a model-based approach for specifying mappings between different message formats and a central "domain dictionary". In order to transform between format X and format Y, one needs two maps: one that maps X from/to dictionary D, and another that maps format Y from/to dictionary D. In embodiment, the approach can be couched in this framework when the message format X is the complex standard XML format and the dictionary D is a simplified/flattened set of models for the domain. Unlike embodiments, the conventional approach uses transforms (or "conversion rules") which are specified manually. However, embodiments are configured to generate its conversions using the tooling (discussed herein) which supports modularity and reuse.

In another conventional approach, a graphical tool is used for the specification of mappings between message formats/models/schemas. This conventional approach requires a schema or model for both the source and target of a transformation. In order to create a transformation between simple objects and standard formats, a user has to first define a schema or model for the simple objects, map the elements of the simplified model (source) to the standard (target) model, and then specify any elements in the target model that have fixed values as assignments. The same process has to be repeated in reverse to map the target model back to the simplified model and achieve bi-directional transformation. However, embodiments disclosed herein take a different approach, which frees the user from doing these tedious and error-prone mapping tasks. Instead of requiring a schema for the simple model to be defined a priori, embodiments instead use a sample instance of the complex model to guide development of the mapping, thereby considerably reducing the effort required. According to embodiments, the user focuses on the pieces of information in the sample that will vary from instance to instance and should therefore be included in the simplified model. Elements whose values are fixed for all instances of the target model can be identified in the sample instance, and the values obtained from the sample can be supplied automatically in transformations, instead of requiring the user to create an explicit assignment for each one. Instead, embodiments also make use of XML instance data which helps to eliminate unlikely paths or recursion that the schema may accommodate but never occur in a production setting.

Certain examples are provided with respect to the health care industry for explanation and not limitation. The health care industry may utilize an HL7 Green CDA. This approach is a recommendation on how to implement a specific customization (also known as a template) of an entire complex healthcare XML standard format, called the HL7 Clinical Document Architecture (CDA), using simplified XML schemas. HL7 Green CDA is a set of recommendations for simplifying the use of CDA through the creation of runtime artifacts (such as schemas/transformations). No specific tools are supplied or recommended for the creation of these artifacts. However, embodiments are configured to automate the process of creating simplified schemas and bidirectional transforms between simplified schemas and standard formats such as CDA.

The modules in embodiments are designed without the limitation of the modules having to be in a specific way. The present disclosure enables the development of abstractions (i.e., modules) based on a specific standard representation of the data. Furthermore, embodiments have a semi-automated (and/or automated) process of generating both schemas and transformations to go between a simpler format and the original complex format.

Now turning to the figures, FIG. 1 illustrates a computer system 100 for creating and configuring modules according to an embodiment. The computer system 100 includes one or more processors 110, memory 120, and input/output devices 170.

The present disclosure provides a solution to the problem(s) or issue(s) described above by designing a tool 160 (having computer-executable instructions) for creating and manipulating modules 180 (such as modules 180-1, 180-2, through 180-N). As discussed herein, a module is an abstraction that captures the key data elements, or parameters, that define some piece of information, while ignoring the structural details of any specific representation. The specific representation may be a large complex original model and/or XML schema 105 (which in some cases may be a legacy model that is not represented in XML, although XML is utilized for explanation purposes). For example, in the clinical information domain, the key values that define a body temperature measurement are the temperature value (e.g., 99.8), the measurement unit (e.g., degrees Fahrenheit), and the measurement technique (e.g., oral, axial, etc.). The tool 160 disclosed herein allows modules 180 abstracting such simple concepts to be defined, and then composed to abstract more complex concepts or collections of concepts. For example, the temperature measurement above might be part of a Vital Signs module 180 (created by the tool 160), which in turn might be a part of a larger module 180 representing an encounter or patient history.

Unlike other tools for creating modules or schemas, the module definition process of the tool 160 in the embodiment is instance-driven. Instance-driven means the tool 160 allows the user to design the module by starting from a sample instance of the abstraction as represented by the complex XML schema 105, not the schema itself. The advantage is that the sample instance is a standard-compliant representation of the abstraction that contains exactly what the module requires, no more and no less. The complex XML schema is general and can be used to represent many things, and gives no guidance as to how a specific abstraction should be represented.

The user starts with a sample XML document 107 (also referred to as sample XML fragment) (of the large original (model) complex XML schema 105) that contains an instance of the concept to be modeled, in a representation in accord with the standard's "best practices" for design. Such samples are typically readily available from the organization promulgating the standard. Note that an instance is an occurrence or a copy of an object, whether currently executing or not. Using a drag-and-drop paradigm, the tool 160 permits the user to designate the key data elements within the standard-compliant representation (including variable data) that constitute the semantic content of the module 180, which become the module's parameters. To facilitate composition, another module 180 can serve as a parameter to any module 180, and modules 180 can be developed in a top-down or bottom-up fashion. To facilitate modules 180 that contain collections of values (or concepts), a parameter may be designated as repeatable.

Once modules 180 (such as modules 180-1, 180-2, through 180-N) are defined, the tool 160 uses their definitions to create various artifacts that facilitate the creation, transformation, validation, and consumption of data. For example, as noted above, the representation of clinical concepts in HL7's standards for interoperability of healthcare data (e.g., given as the large original complex XML schema 105) is quite complex, and creation of conformant objects with existing tools is difficult and error-prone. However, using the tool 160 according to embodiments, given a suitable set of modules 180 describing the relevant concepts, the user can automatically create:

1) An XML schema (or Ecore model) for a simplified representation of each concept that is easy to instantiate and understand, but yet captures its key elements.

2) A pair of XSLT transformations that perform bi-directional conversion between the simplified and standard-compliant representations. Compositions or collections of these concepts (as modules 180) can likewise be transformed. Note that XSLT (extensible stylesheet language transformations) is a language for transforming XML documents into other XML documents or other objects.

To expedite the construction of modules 180 tailored for a particular use case, an existing module 180 can be copied and modified to represent a more specific concept (clone-and-constrain). For example, if all temperature readings collected in a particular context were measured orally in degrees Fahrenheit, the tool 160 allows one to clone an existing temperature module and constrain these elements (i.e., variable parameters) to fixed values. The simplified representation generated for this new module 180 requires only the temperature value to be specified, and is therefore easier for an analytic or another software application to create and/or consume, but the transformations of the tool 160 that convert to/from the standard-compliant representation (i.e., the large original complex XML schema 105) supply (or remove) this fixed information automatically. By utilizing the composition and clone-and-constrain mechanisms of the tool 160, a user can start with a library or dictionary of basic modules 180 and rapidly create those (more specific) modules 180 needed for some specific purpose. For example, the tool 160 is configured to allow the user to add the basic module 180 as parameters into the specific module 180 and for creating the specific module 180, as further discussed.

Achieving similar results using existing state of the art would be more difficult. As an assumption, a user would need to carry out two steps, most likely using two different tools in the state of the art: 1) Design a simplified representation and create an XML schema to represent it. Although there are many schema-definition tools, designing a schema de novo is more difficult than selecting key elements from an instance and specifying a small number of properties, like repeatability. 2) Use a mapping tool to create XSLT transformations between the simplified representation and the standard-compliant representation, and vice-versa. As noted above, mapping tools require an in-depth knowledge of both the source and target schemas, and often require the user to express complex conditions to select the relevant parts of the source document to be transformed while excluding those with similar structure. However, according to embodiments, the instance-based approach of the tool 160 is far simpler, because the user can refer to a sample document (e.g., sample XML document 107) that satisfies the necessary conditions, and let the tool 160 do the work of formulating them. In addition to requiring the user to switch among multiple tools in the state of the art, existing tools for both steps typically provide little support for composition and reuse. Note, the necessary conditions means that the sample document should be a valid example of the abstraction the module in intended to represent. For example, if the user wants to represent a blood pressure, then the sample must include all of the attributes required by the standard to be considered a valid blood pressure.

Now turning to a specific example of module creation and configuration for explanation purposes and not limitation. FIGS. 2A, 2B, 2C, 2D, 2E, 2F, 2G, and 2H (generally referred to as FIG. 2) illustrate specific examples (e.g., displayed to the user) of utilizing the tool 160 to create and configure modules 180 according to an embodiment.

Figure 2B:
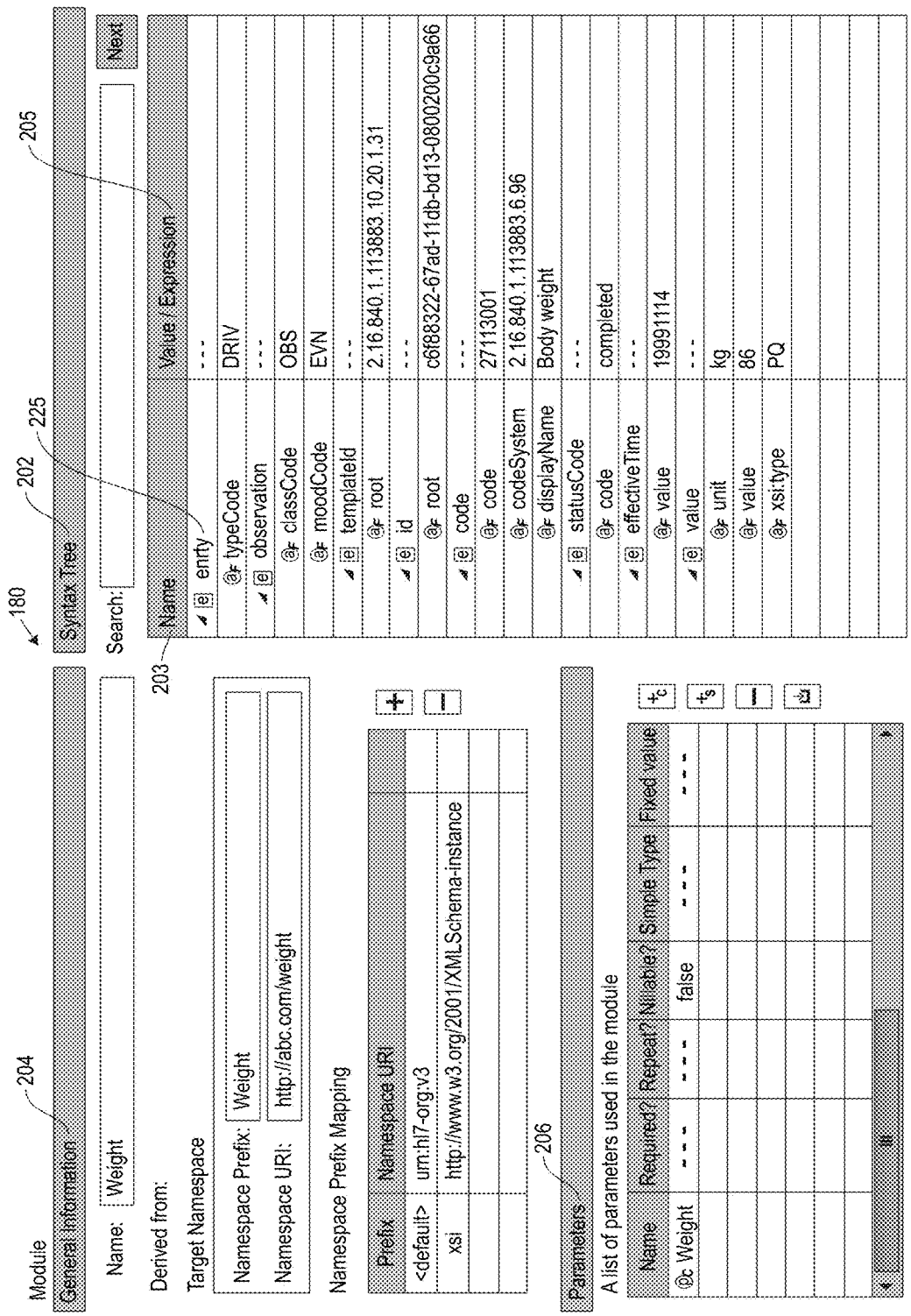
Figure 2C:
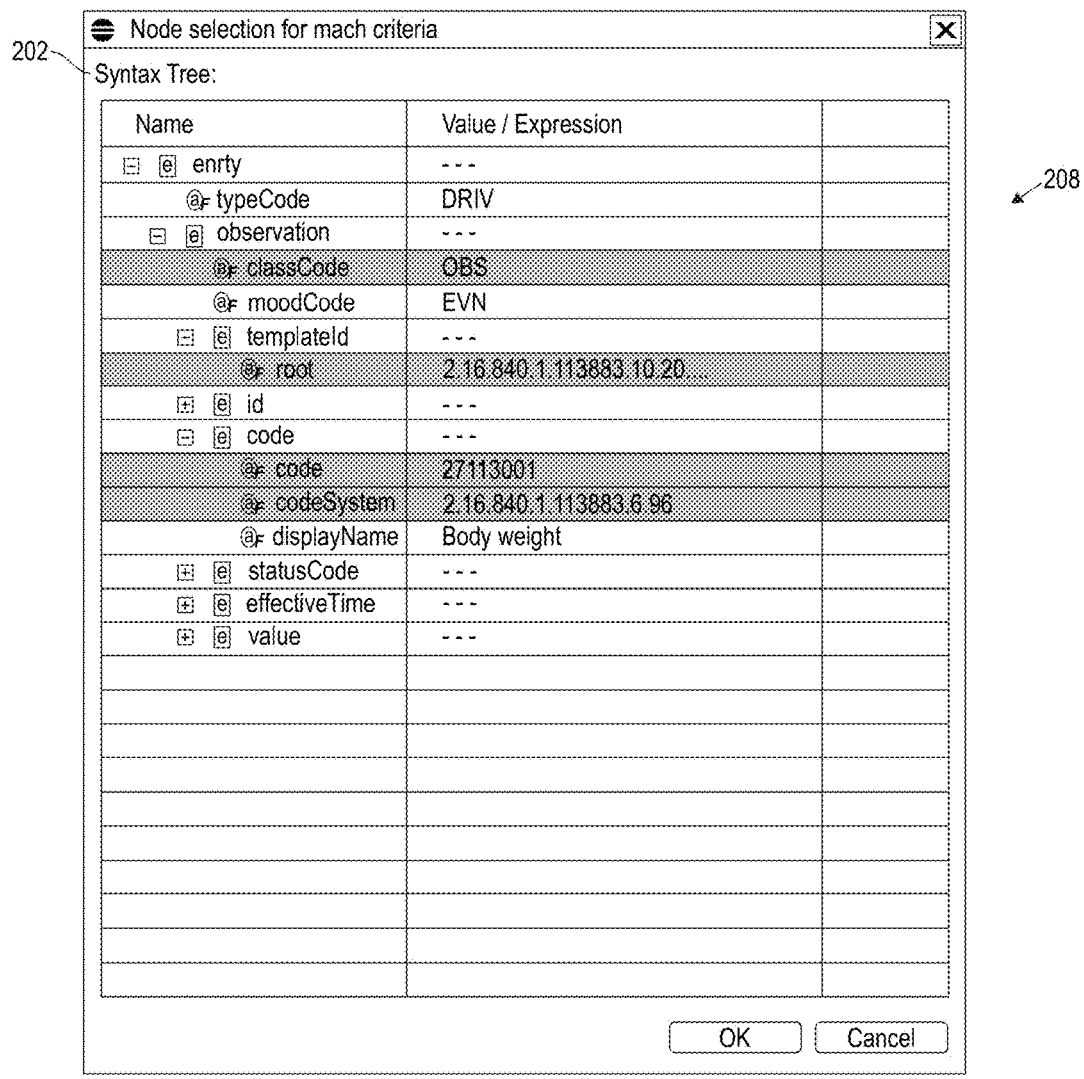
Figure 2H:
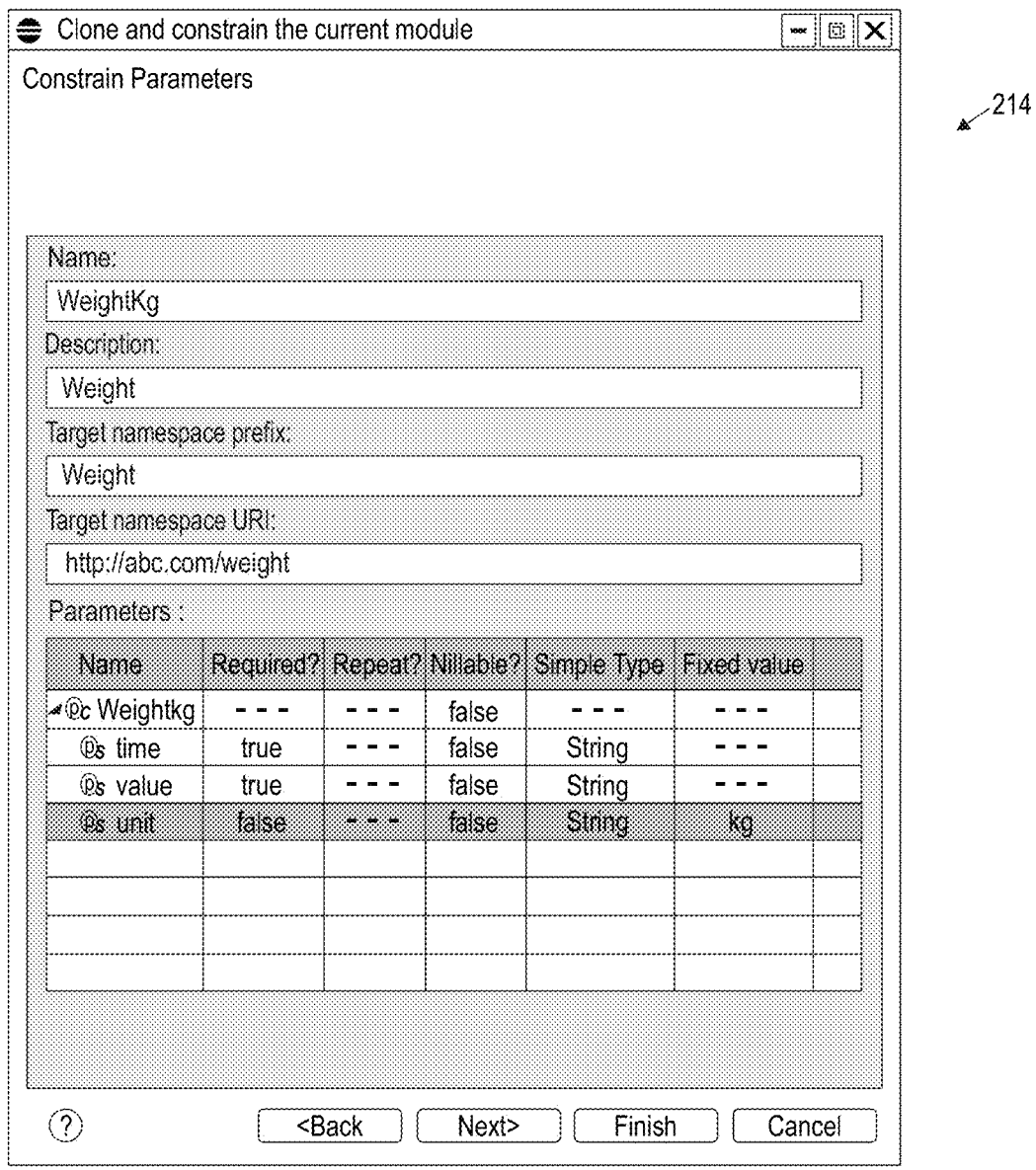
Figure 3:
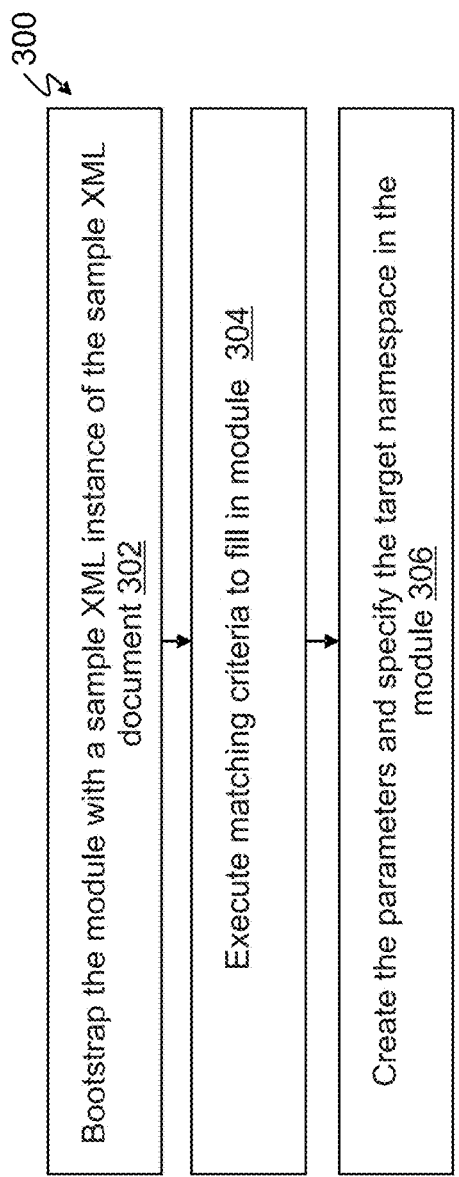
FIG. 3 illustrates module creation operations according to an embodiment.

To show various module operations by the tool 160, FIG. 2 describes operations and the life-cycle of a module including module creation, module composition, and module cloning. During module creation, the tool 160 is configured to execute various operations 300 as illustrated in FIG. 3. Reference can be made to FIGS. 2 and 3.

At block 302, the tool 160 is configured to bootstrap the module 180 (being created) with a sample XML document 107. The sample XML document 107 is provided in advance, and an example sample XML document 107 is shown in FIG. 2A. The user may select a specific fragment (of an instance of the complex XML schema 105 or the whole document) to be the sample XML document 107, by using XPath query or an XML document navigator of the tool 160, and this maps the sample XML document 107 to the module 180, as understood by one skilled in the art. The tool 160 creates a syntax tree 202 by traversing the selected sample XML fragment/document 107, as shown in FIG. 2B. For each element or attribute in the sample XML document 107, a node is created and is added to the parent node in the syntax tree 202. Initially, the tool 160 is configured to designate each node of type FixedNode (designated with an F) in the syntax tree 202. The tool 160 stores the syntax tree 202 in the created module 180 through the "syntax" attribute. In FIG. 2B, the syntax tree 202 is presented in the module editor of the tool 160 displayed to the user. This initial syntax tree 202 reassembles the original sample XML fragment/document 107, but can be modified as discussed herein. For example, if any node (i.e., element or attribute has any content or value) in the syntax tree 202 should be designated a variable node, the user can select a desired node and change the selected node into a variable node via the tool 160.

During module creation, the tool 160 is configured to create the module 180 from and based on the sample XML document 107 in FIG. 2A. The sample XML document 107 is a sample instance utilized to create the syntax tree 202 which is utilized to create the module 180 in FIG. 2B. As shown in FIG. 2B, the module 180 includes the syntax tree 202, general information 204 (initially empty), and parameters 206 (initially empty). The syntax tree 202 is a representation of the abstract syntactic structure of the sample XML document 107 from the complex XML schema 105. Each node/element of the syntax tree 202 denotes a construct occurring in the source code (e.g., XML). The syntax is 'abstract' that it does not represent every detail appearing in the real syntax of the sample XML document 107. The syntax tree 202 has two columns, which are the Name column 203 and the Value/Expression column 205. The Name column 203 has the names of various for various entries. The Value/Expression column 205 has the value input (initially all designated as Fixed values (F)) for those entries (built from the sample XML document 107). As can be seen, the syntax tree 202 has a displayName Body weight, an effectiveTime (value) 19991114, a unit kg, and a (weight) value 86.

Continuing FIG. 3, at block 304, a user uses the tool 160 to specify matching criteria to fill in module 180. Since there could be many elements with same name or type that exist in the sample XML document 107 (taken from original (document) complex XML schema 105), in order to identify the correct element to be mapped to this module 180, a matching criteria is defined usually for the root element of the syntax tree 202. The top entry in FIG. 2B is entry 225. The matching criteria contains a set of conditions (usually a set of fixed nodes) to identify the XML fragment/document 107 from the original document, which correspond to this module 180. FIG. 2C is an example of a display box 208 of tool 160 for such matching criteria to identify the Weight observation entry in an HL7 CDA (i.e., the complex XML schema 105), which includes the template Id, the code as well as the correct class code. The matching fills in information into the module 180 of FIG. 2B. In the module 180, the general information 204 section may list the name (e.g., weight), target namespace, and namespace prefix mapping. The matching criteria selected by the user are indicated in the syntax tree.

At block 306, the tool 160 is configured to create the parameters and specify the target namespace in the module 180. From the syntax tree 202 presented, the user of the tool 160 may identify and/or the tool 160 is configured to indicate all the variable pieces of elements or attributes in the syntax tree 202 (with a V), and then turn the variable pieces into parameters 206. Using the module editor of the tool 160, a user can select these Fixed nodes (turning them from Fixed nodes (F) into variable nodes (V)) and drag them into the parameters 206 as shown in FIG. 2D.

The parameters 206 section is a table with a list of parameters for the module 180. Each module 180 that is created (and/or copied) has its own syntax tree 202, general information 204 section, and parameters 206 section. The parameter 206 table can have a nested structure. The tool 160 is configured to input the name weight in the parameters 206. Other parameters 206 (as sub-modules) may be added as discussed further. The table for the parameters 206 has various columns: required column, repeat column, nillable column, simple type column, and fixed value column. In the tool 160, the follow columns are defined:

Required column: the abstraction is not valid without a value for this parameter. A value must be specified for this parameter in the simplified schema in order to construct a valid instance of the complex schema, and conversely, a correct instance of the complex schema will always produce a value for this parameter in the simplified schema.

Repeat column: multiple values may be supplied for this parameter when constructing an instance of the simplified schema, and multiple values may be produced from an instance of the complex schema. This column is most often used for module parameters, e.g., a vital signs section may contain multiple blood pressure measurements.

Nillable column: can be set to the special XML "nil" value.

Simple type column: for simple parameters only, the XML type, e.g., integer, string, date, etc.

Fixed value column: a parameter may be bound to a fixed value in a module derived from it through the clone-and-constrain process, e.g., binding the unit to "kg" in a specialization of the Weight module.

Constraints column: The constraints column describes any additional constraints on a simple parameter, such as length, min/max length and pattern (similar to the facet in XML schema)

The General Information section defines the target namespace for the simplified schema and the prefixes to be used for other namespaces referenced in this module. The Parameters section defines the semantic content of the module; parameters may be simple values or other modules. The Hierarchy section shows how modules have been composed. The Logical hierarchy is the module composition hierarchy itself; the Physical hierarchy is the hierarchical structure of elements in the simplified schema for the module.

In one case, the user utilizes the tool 160 to identify and select (e.g., highlight) the variable pieces of information from the instance (i.e., from the syntax tree 202), and the user adds (clicks and drags) the variable pieces of information into the parameters 206 table. The variable pieces of information input into the parameters 206 table under weight include time, value, and unit. The tool 160 performs any mapping needed to utilize the identified variable pieces of information by copying the path for each node.

Figure 4:
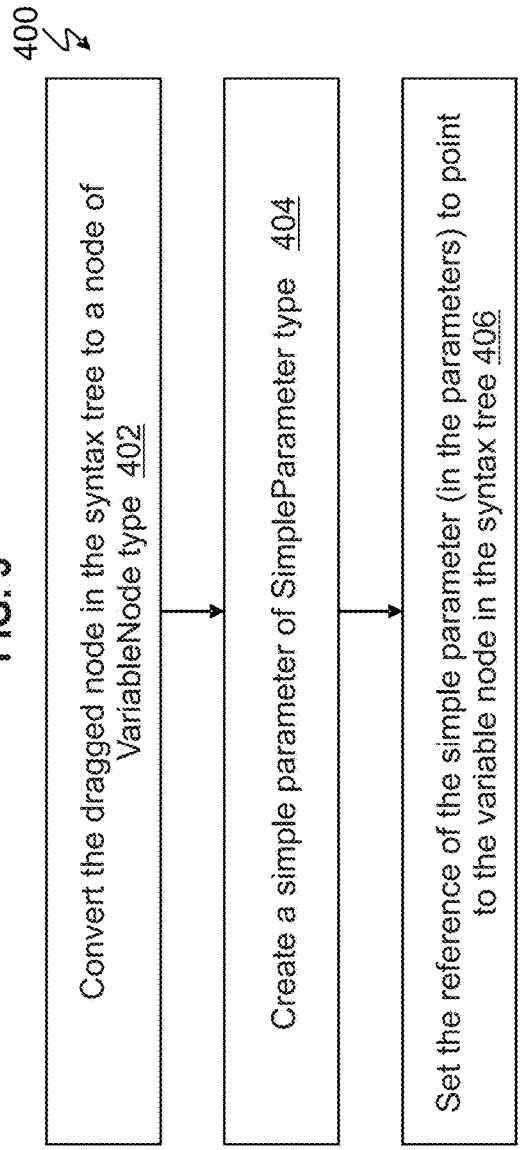
FIG. 4 illustrates drag-and-drop operations for adding parameters according to an embodiment.

Referring to FIG. 4, FIG. 4 illustrates an example of the drag-and-drop operation 400 executed by the tool 160 for adding parameters according to an embodiment. The tool 160 is configured to convert the dragged node (e.g., copied from the syntax tree 202 into the parameters 206) in the syntax tree 202 to a node of VariableNode type at block 402, create a simple parameter of SimpleParameter type at block 404, and set the reference of the simple parameter in the parameters 206 to point to the variable node (designated with V) in the syntax tree 202 at block 406. Via the tool 160, whatever is being displayed in the parameters 206 table forms a type definition in XML that captures the key element of the concept that this module 180 represents. With this new type, the user can create an XML instance to represent the key element values. Such instance is much simpler than the original sample XML document 107 because many boilerplate structures and context information are already captured in the syntax tree 202 of the module 180, and therefore, can be ignored in the new type. The user can then specify the namespace of the module 180. This namespace is the target namespace of the type defined by this module 180.

Additionally, to identify and create parameters 206 for the module 180, the tool 160 is configured so that the user can select (e.g., right click or highlight) any element (or node) under the name 203 in the syntax tree 202. Once the elements (or nodes) are selected, the user can designate each element with a V to indicate that the element is a variable piece of information in the tool 160. For all elements (nodes) in the syntax tree 202 designated with the V, the tool 160 converts the elements (nodes) in the syntax tree 202 to a node of VariableNode type, creates a simple parameter of SimpleParameter type for the elements (nodes) designated as V, and sets the elements (nodes) designated with V as simple parameters in the parameters 206 section. As can be seen, the tool 160 presents various ways to capture and add the variable pieces of information into the parameters 206 section.

The tool 160 is configured to further refine the parameters 206, such as for example changing the name, setting an optional attribute, and specifying any additional expand or extract pre-preprocessing function.

Now for module composition, the tool 160 is configured to perform similar mechanisms as discussed above in creating another module 180 shown in FIG. 2E For example, the tool 160 loads in another sample XML document 107 from the large original complex XML schema 105 to generate a syntax tree 202. Particularly, the tool 160 creates a section-level module 180, called VitalSignsSection, and the tool 160 captures the logical organization of different vital signs from the syntax tree 202 (taken from the vital signs sample XML document 107). The module 180 in FIG. 2E has the same structure as discussed above (for FIG. 2B), which includes the syntax tree 202, general information 204, and parameters 206 (all of which is specific to the particular sample XML document 107 related to vital signs).

The tool 160 is configured to add the previously created Weight module 180 into the VitalSignsSection module 180 as displayed in FIG. 2F. In one case, the use of the tool 160 may click and drag the Weight module 180 (e.g., entry 210 in the syntax tree 202 of the VitalSignsSection) to place the Weight module 180 in the parameters 206 section of the VitalSignsSection module 180. Accordingly, by adding the Weight module 180 to the parameters 206 section of the VitalSignsSection, the tool 160 brings along (i.e., references) the parameters corresponding to the Weight module 180 to now be applied to the VitalSignsSection module 180. As such, the tool 160 quickly and easily refines the parameters 206 for the VitalSignsSection module 180.

Figure 11:
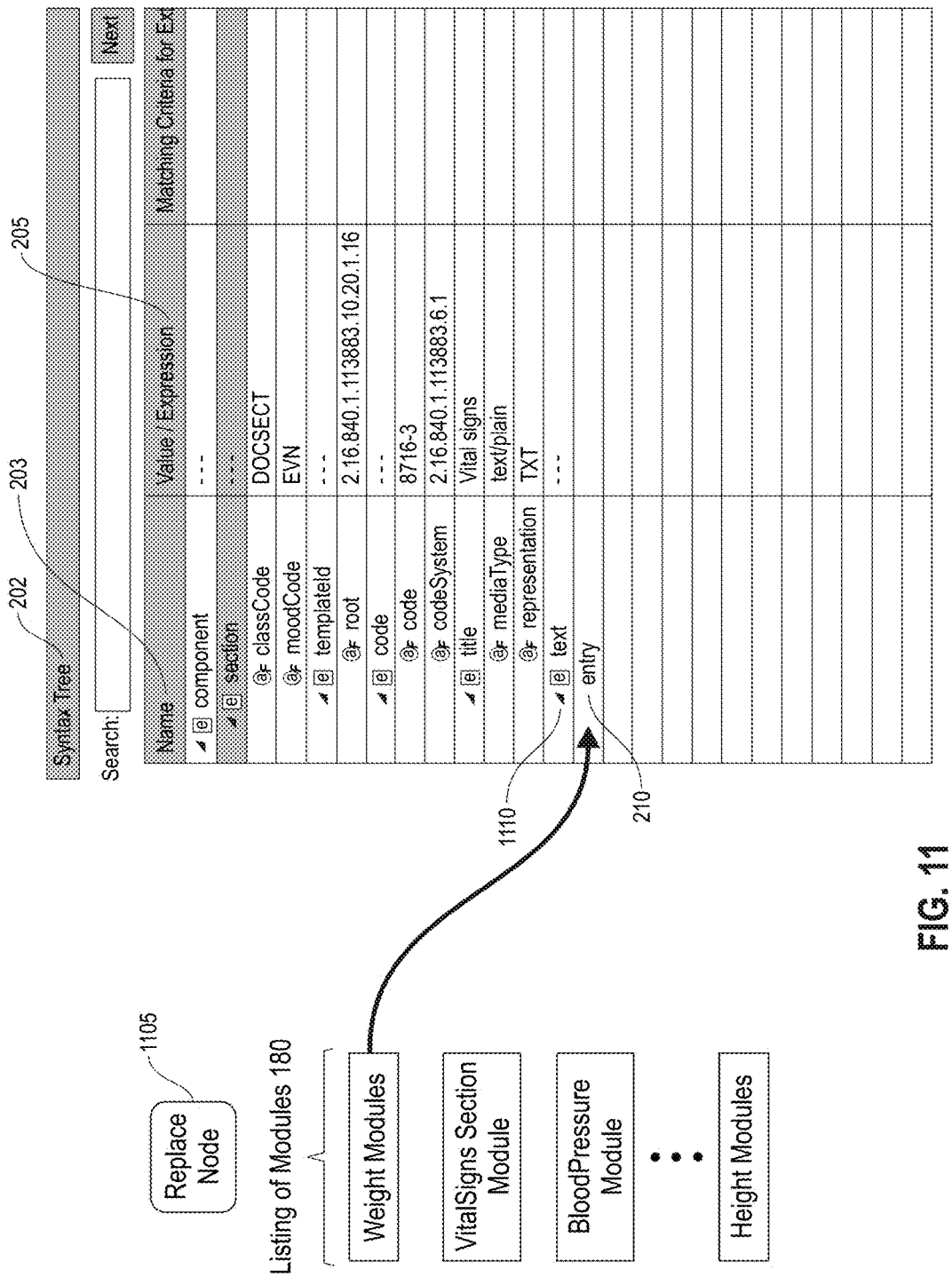
FIG. 11 illustrates a listing of created modules that can be added and anchored in a syntax tree of a module according to an embodiment.

As one example of adding the Weight module 180 to the syntax tree 202 of the VitalSignsSection module 180 so that the Weight module 180 can be selected by the user as a parameter 206 in the VitalSignsSection module 180, reference is made to FIG. 11. FIG. 11 displays the listing of different modules 180 that have been created (on the left) via the tool 160. The user has selected the VitalSignsSection module 180 so that its syntax tree 202 is displayed on the right (note that other portions of the VitalSignsSection module 180 are present but not shown in FIG. 11 for the sake of conciseness). To add the Weight module 180 and any other module 180 to the syntax tree 202 of the VitalSignsSection module 180, which can then be added to the parameters 206 of the VitalSignsSection module 180, the user can click and drag the weight module 180 to the syntax tree 202 of VitalSignsSection module 180. This process creates the entry 210 as an anchor point into hierarchy of the VitalSignsSection module 180. When user adds the Weight module 180 to the VitalSignsSection module 180, the user has to identify the place in the syntax tree 202 where the Weight module 180 is to be anchored. By anchoring the Weight module 180 in the syntax tree 202, the tool 160 maps the parameters corresponding to the Weight module 180 in the syntax tree 202 of the VitalSignsSection module 180. This process can be repeated for each of the modules 180 such as the BloodPressure Module 180, the Height module 180, and any other modules 180 so that more and more modules 180 are anchored in the syntax tree 202 of VitalSignsSection module 180. Also, anchoring modules 180 into the VitalSignsSection module 180 can be performed by replacing an existing node. For example, the user may select the replace node 1105 button (shown in FIG. 11) in the tool 160, and then select the desired node to be replaced. In this case, the user may select (e.g., highlight or type in the name for) the text node 1110, which informs the tool 160 that the text node 1110 is going to be replaced. Note that the text node 1110 contains the narrative description of the vital signs. The user can then select the Height module 180 as the replacement node and/or can drag the Height module 180 over the text node 1110. The tool 160 is configured to anchor the Height module 180 in the syntax tree 202 of the VitalSignsSection module 180 and replace the text node 1110 at that hierarchical position. The Height module 180, now anchored as a node in the syntax tree 202 of the VitalSignsSection module 180, is the Vital Signs Narrative Block module. This modularity and reusability allows the user to create various modules 180 for different use cases.

Additionally, the tool 160 may configure and create a BloodPressure module 180 (from a sample XML document 107 for blood pressure taken from the large original complex XML schema 105) as discussed above for the Weight module 180 and the VitalSignsSection module 180. The BloodPressure module 180 (shown as entry 212 in the syntax tree 202 of the VitalSignsSection) is added (e.g., automatically by the tool 160 and/or by clicking and dragging) into the parameters 206 section of the VitalSignsSection module 180, as shown in FIG. 2G. As can be recognized, this process allows any module 180 to become a sub-module of another module 180.

As another feature to configure the parameters, the tool 160 is also configured to execute clone-and-constrain as discussed below. For example, with the new Weight module 180, a user can further simplify the module 180 by restricting the unit to be "kg" (kilograms) (if this is the value a users expect to receive input of weight value) using the "clone-and-constrain" mechanism of the tool 160. As one option, the tool 160 is configured for the user to select the unit in the parameter 206 section, select (click) the fixed value column for the unit, and then enter the fixed value of "kg" in the fixed value column. FIG. 2H displays a constrain parameters dialog box 214 which allows the user to clone the Weight module 180 and specify (constrain) the fixed value to be "kg".

Figure 5:
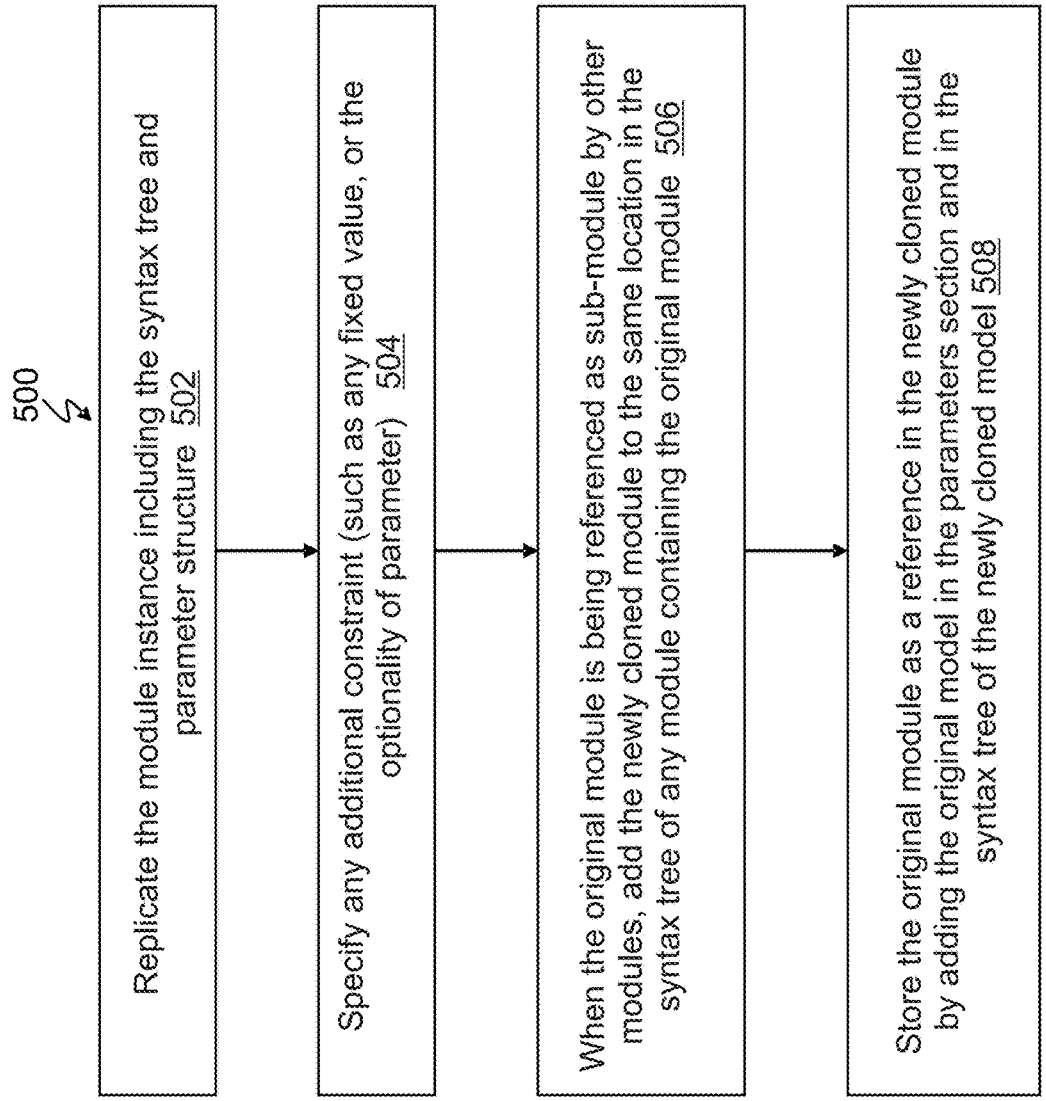
FIG. 5 illustrates clone-and-constrain operations performed against a given module according to an embodiment.

Additionally, clone-and-constrain of the tool 160 allows the user to create a new module 180 by refining the specified semantic of an existing module 180 (such as the Weight module) without the need of knowing (and displaying) the mapping to the original instance (i.e., to the original Weight module 180 or its original sample XML document 107). Refining the semantics of the module 180 means constraining the module 180 to represent a more specific concept. For example, clone-and-constrain of tool 160 can be achieved by performing the following operations 500 against a given module 180, as shown in FIG. 5.

At block 502, the tool 160 is configured to replicate the module instance (e.g., of the Weight module 180) including the syntax tree 202 and parameter 206 structure into a cloned module 180.

The user via the tool 160 can then specify any additional constraint (such as any fixed value, or the optionality of parameter) at block 504. The additional constraint will be recorded directly in the parameter 206 structure of the cloned module 180. The constraint may be always having a fixed value for the unit (parameter) of "kg", as discussed in FIG. 2H. Also, the fixed value may always be a specified number value.

At block 506, when the original module 180 (e.g., Weight module 180) is being referenced as sub-module by other modules 180 (i.e., the Weight module 180 is a sub-module in the parameters section of the VitalSignsSection module 180), the tool 160 is configured to automatically add the newly cloned module 180 to the same location in the syntax tree 202 of any module containing the original module 180. For example, the tool 160 adds both the weight module 180 and the cloned module 180 in the parameters 206 of the VitalSignsSection module 180, so that the VitalSignsSection module 180 operates according to these added parameters.

At block 508, the tool 160 is configured to store the original module 180 as a reference in the newly cloned module 180 (e.g., by adding the original model 180 in the parameters 206 section and into the syntax tree 202 of the newly cloned model 180). In this case, the parameter 206 section of the cloned modes now includes and references the Weight module 180.

Figure 6A:
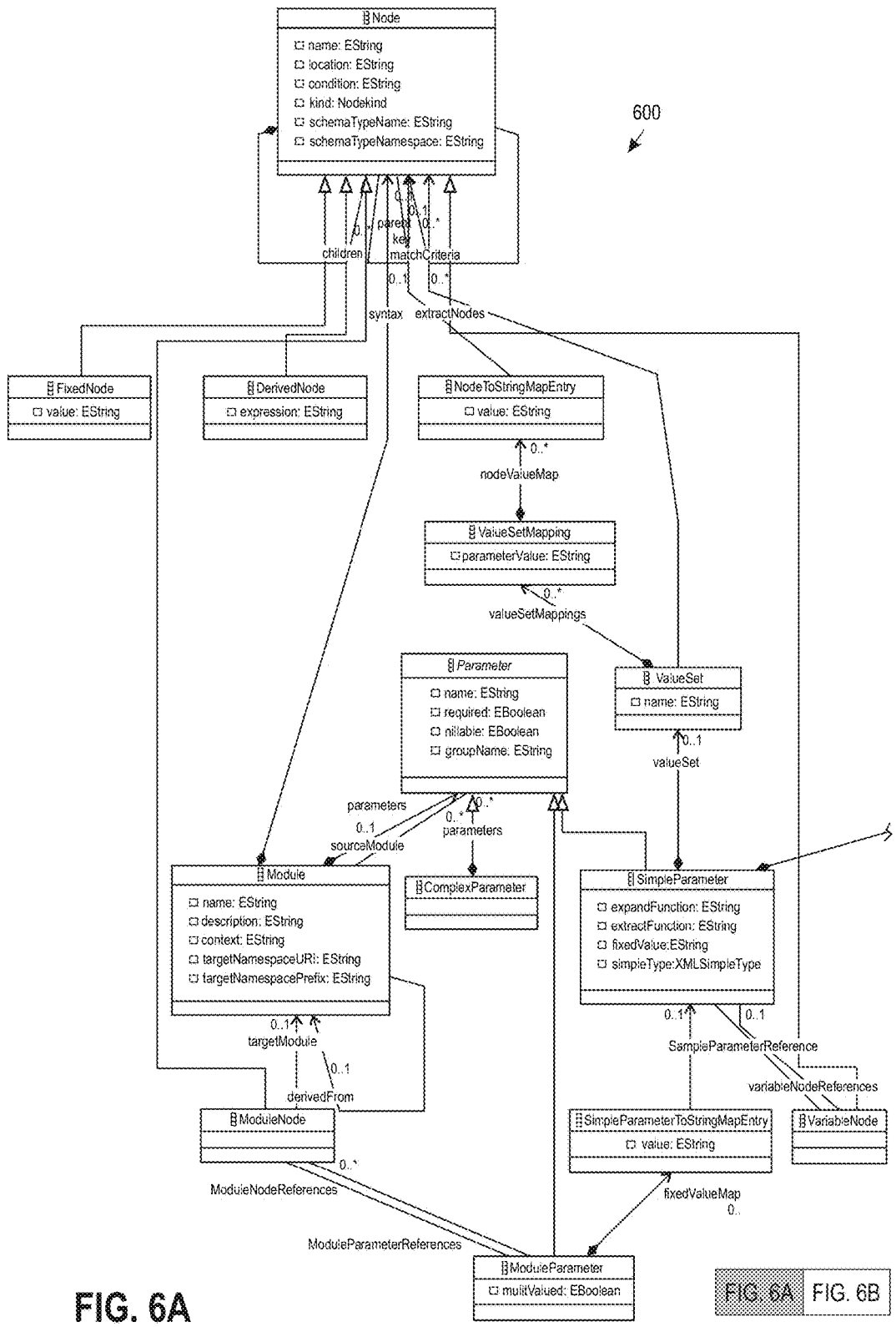
FIGS. 6A and 6B illustrate a module model utilized for building the modules according to an embodiment.
Figure 6B:
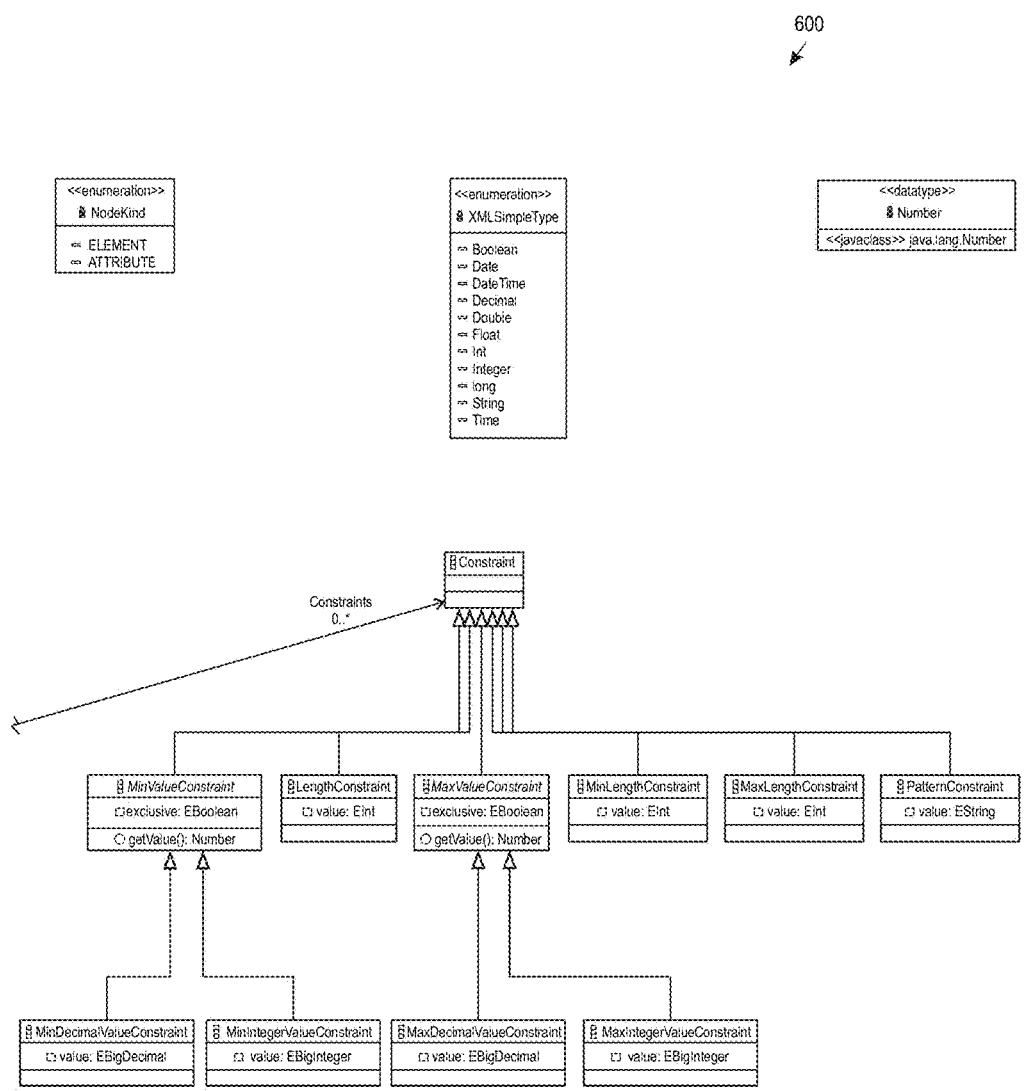

Now turning to FIGS. 6A and 6B, FIGS. 6A and 6B illustrate a module model 600 of the tool 160 utilized for building the modules 180 according to an embodiment. The various operations, procedures, methods, etc., discussed herein can be performed against module model 600.

With reference to FIGS. 6A and 6B, sub-headings are illustrated below for explanation purposes and not limitation. The module model 600 may include the following classes:

Core Classes:

Module: The module is the top-level class in the module model. A module is composed of parameters and nodes.

Parameter: A parameter is used to define data elements for a given module. There are three different types of parameters that are described below.

Node: A node is used to define the syntax for a module relative to the complex schema or model that the user is building the abstraction for. There are four different types of nodes that are described below.

Parameter-Related Classes:

SimpleParameter: A simple parameter represents a simple data element that is typically of type String but could be typed to other simple types taken from XML Schema (e.g., int, boolean, etc.)

ComplexParameter: A complex parameter is a composition of another parameter (simple, complex, or module). A complex parameter can be used to represent a complex data type.

ModuleParameter: A module parameter represents data defined in some other module. It is a (mostly) opaque construct in that it is intended to be a place holder for simple or complex data elements that are defined elsewhere.

Node-Related Classes:

FixedNode: A fixed node is a node that contains a fixed string value that will also be generated from the syntax tree.

VariableNode: A variable node is a simple piece of data that varies from one instance to the next and is bound to a simple parameter.

DerivedNode: A derived node gets its value from the evaluation of an expression (e.g., XPath). As understood by one skilled in the art, an XPath is used to navigate through elements and attributes in an XML document.

ModuleNode: A module node represents a placeholder in the syntax tree where another module is referenced. During generation phase, the value of the module node is computed based on the value of another module. A module node is bound to a module parameter. Like a module parameter, a module node is (mostly) opaque.

Enumerations/Utility Classes:

NodeKind: Node kind is used to define the type of node from an XML perspective. NodeKind has two values ELEMENT and ATTRIBUTE.

XMLSimpleType: XMLSimpleType is an enumeration used to define the set of allowable XML simple types that can be used when defining a simple parameter.

Additionally, the module model 600 provides support for value sets. Value sets are predefined sets of values for a given attribute. So for example, if the user has a Lab Result with a code that represents what type of Lab it is (e.g., Glucose, LDL cholesterol, etc.), the user of the tool 160 can create a value set with all of the legal possible values for that attribute. When generating the simplified XML schema (i.e., the model 180), value sets are represented using XSD (XML Schema Definition) enumerations.

The module model 600 of the tool 160 provides support for simple data constraints. Data constraints can restrict what the actual data values look like within a simplified schema. Some examples of these constraints include:

1) Min Integer Value—minimum allowed integer value;
2) Max Integer Value—maximum allowed integer value;

3) Min Length—minimum length of a value in characters; and

4) Pattern constraint—the value must follow a specific regular expression.

Figure 7A:
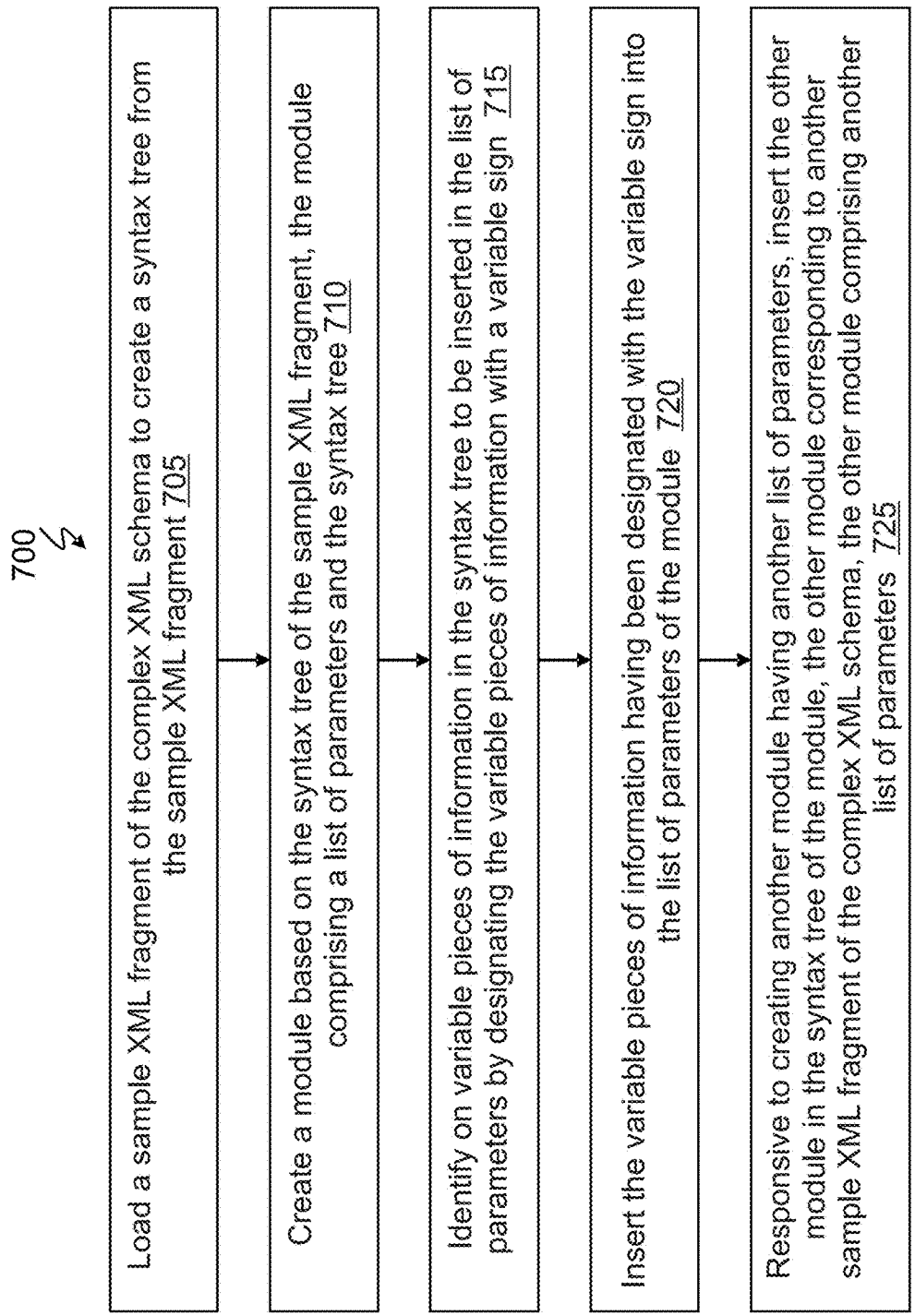

FIGS. 7A and 7B illustrate a method 700 (executed by the tool 160) for creating modules from a complex extensible markup language (XML) schema according to an embodiment.

The tool 160 is configured to load an instance of the sample XML fragment of the complex XML schema to create a syntax tree from the sample XML fragment at block 705. The tool 160 is configured to create a module based on the syntax tree of the sample XML fragment, in which the module includes a list of parameters and the syntax tree at block 710.

At block 715, the tool 160 is configured to identify variable pieces of information in the syntax tree to be inserted in the list of parameters by designating the variable pieces of information with a variable sign.

The tool 160 is configured to insert the variable pieces of information having been designated with the variable sign into the list of parameters of the module at block 720.

In response to creating another module having another list of parameters, the tool 160 is configured to insert the other module in the syntax tree of the module, in which the other module corresponds to another sample XML fragment of the complex XML schema, and the other module includes another list of parameters at block 725.

The tool 160 is configured to identify the other module with the variable sign in the syntax tree of the module at block 730. The tool 160 is configured to insert the other module having been designated with the variable sign into the list of parameters of the module in which the other module serves as a parameter at block 735.

The tool 160 is configured to provide an option for constraining the module, where constraining the module allows creation of a cloned module by refining a specified semantic of the module already existing without visibly displaying mapping to the sample XML fragment and without requiring a user to be aware of the mapping to the sample XML fragment at block 740.

Additionally, constraining the module includes creating the cloned module as a clone of the module, which includes replicating the syntax tree of the sample XML fragment and replicating the list of parameters of the module as a replicated list of parameters in the cloned module. A constraint is specified on at least one parameter in the replicated list of parameters, where the constraint includes at least one of removing a requirement of inputting a value for a first variable piece of information, applying a fixed value to a second variable piece of information such that the second variable piece of information becomes fixed, and removing a third variable piece of information from the replicated list of parameters.

Also, constraining the module further includes determining that the module is being referenced as a sub-module by different modules in respective syntax trees of the different modules, and based on determining that the module is being referenced as the sub-module by the different modules, adding the cloned module in a same location in the respective syntax trees of the different modules. The module is stored as a reference in the cloned module.

The method also includes creating a plurality of modules each respectively corresponding to a plurality of sample XML fragments of the complex XML schema, where the plurality of modules respectively comprise respective lists of parameters. Each of the plurality of modules are inserted into the syntax tree of the module, and for the plurality of modules that have been inserted into the syntax tree of the module, the tool 160 inserts the plurality of modules into the list of parameters for the module.

The tool 160 the module is reusable and is (or corresponds to) a simplified schema as compared to the sample XML fragment from which the module 180 was created. Multiple modules 180 (e.g., at least one or more) can be created from each sample XML fragment, and different sample XML fragments 107 constitute the entire complex XML schema 105.

FIG. 8 illustrates an example of an algorithm 800 (executed by the tool 160) to generate a simplified schema (i.e., the desired module 180) according to an embodiment. The algorithm of tool 160 may start with a basic module (model) to generate the simplified schema desired module 180. Note that each created module 180 (with its parameters and variable pieces of information) is a simplified schema instance and/or represents a simplified schema instance. The created modules 180 are abstractions of one or more sample XML fragments 107 that make up the large complex XML schema 105. For example, the Weight Module 180 is an instance of a simplified XML schema, VitalSignsSection module 180 is an instance of a simplified XML schema, and BloodPressure module 180 is an instance of a simplified schema.

In the current embodiment the transformations are XSLT scripts that convert between the simplified schema(s) and the complex schema, and vice versa (i.e., in either direction). For example, FIGS. 9A, 9B, and 9C (generally referred to as FIG. 9) illustrate an example of an algorithm 900 (executed by the tool 160) to generate the expand transform according to an embodiment. In FIG. 9, the tool 160 is configured to move from simple to complex (i.e., expand).

However, FIG. 10 illustrates an example of an algorithm 1000 (executed by the tool 160) to generate the extract transform according to an embodiment. In FIG. 10, the tool 160 is configured to move from complex to simple (i.e., extract). The choice of XSLT as a language for implementing the transformations is not critical, and the same approach could be used with other transformation languages, such as e.g., XQuery.

Via the tool 160 (or other software tools in the art), note that a software developer (with no underlining understanding of the large complex XML schema 105) can take the modules 180 (e.g., each simplified schema) and transform the simplified schemas into an instance of the complex XML schema 105 via the algorithm 900 shown in FIG. 9. In the reverse direction, the software developer (with no underlining understanding of the large complex XML schema 105) can take the large complex XML schema 105 and transform large complex XML schema 105 into the instances of the simplified schemas via the algorithm 1000 shown in FIG. 10.

Accordingly, the tool 160 output three packages: (1) the simplified XML schemas (such as the simplified XML schema of the Weight Module 180, the simplified XML schema of VitalSignsSection module 180, and the simplified XML schema of the BloodPressure module 180); (2) the XSLT transformation from the simplified XML schemas to the complex XML schema 105 (via FIG. 9), and (3) the XSLT transformation from the complex XML schema 105 to the simplified schemas (via FIG. 10).

As discussed herein, the tool 160 reduces complexity because complex data structures taken from industry standard XML based information models 105 are reduced via abstraction (i.e., created module 180). Application developers need only worry about the simplified schemas produced by the tooling (i.e., 160) and do not need to be experts in the underlying standard. The tool 160 improves understandability because the simplified schemas represent abstracts of domain concepts (e.g., blood pressure). This allows application developers to focus on the domain itself and not worry about the underlying representation. Additionally, the tool 160 increases productivity because the application developers can develop applications faster because they do not have the steep learning curve that a complex industry standard imposes.

Embodiments provide modularity (i.e., individual modules 180), composability (i.e., the modules 180 are created as desired by the user), and reusability (each created module 180 can be reused (with its parameters 206 changes as desired) and then used a sub-modules 180 in the parameters 206 of other modules). In a state of the art system, the emphasis could be based on starting with one complete monolithic sample instance. In embodiments, the tool 160 allows users to create modules (i.e., unit of abstraction) based on smaller instance fragments 107 and compose those modules 180 in different ways for different use cases.

Now, further regarding the example computer 100, the computer 100 (including the tool 160) that may implement features discussed herein. For example, various methods, procedures, modules, flow diagrams, tools, applications, elements, and techniques discussed herein may also incorporate and/or utilize the capabilities of the computer 100. The computer 100 may be a distributed computer system over more than one computer.

Generally, in terms of hardware architecture, the computer 100 may include one or more processors 110, computer readable storage memory 120, and one or more input and/or output (I/O) devices 170 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 110 is a hardware device for executing software that can be stored in the memory 120. The processor 110 can be virtually any custom made or commercially available processor, a central processing unit (CPU), a data signal processor (DSP), or an auxiliary processor among several processors associated with the computer 100, and the processor 110 may be a semiconductor based microprocessor (in the form of a microchip) or a macroprocessor.

The computer readable memory 120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 may incorporate electronic, magnetic, optical, and/or other types of storage media. Note that the memory 120 can have a distributed architecture, where various components are situated remote from one another, but can be accessed by the processor 110.

The software in the computer readable memory 120 may include one or more separate programs, each of which comprises an ordered listing of executable instructions for implementing logical functions. The software in the memory 120 includes a suitable operating system (O/S), compiler, source code, and one or more applications such as the tool 160 of the exemplary embodiments. As illustrated, the application comprises numerous functional components for implementing the features, processes, methods, functions, and operations of the exemplary embodiments.

The operating system may control the execution of other computer programs, and provides scheduling, input-output control, file and data management, memory management, and communication control and related services.

The application (e.g., software tool 160) may be a source program, executable program (object code), script, or any other entity comprising a set of instructions to be performed. When a source program, then the program is usually translated via a compiler (such as the compiler), assembler, interpreter, or the like, which may or may not be included within the memory 120, so as to operate properly in connection with the O/S. Furthermore, the application can be written as (a) an object oriented programming language, which has classes of data and methods, or (b) a procedure programming language, which has routines, subroutines, and/or functions.

The I/O devices 170 may include input devices (or peripherals) such as, for example but not limited to, a mouse, keyboard, scanner, microphone, camera, etc. Furthermore, the I/O devices 170 may also include output devices (or peripherals), for example but not limited to, a printer, display, etc. Finally, the I/O devices 170 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 170 also include components for communicating over various networks, such as the Internet or an intranet. The I/O devices 170 may be connected to and/or communicate with the processor 110 utilizing Bluetooth connections and cables (via, e.g., Universal Serial Bus (USB) ports, serial ports, parallel ports, FireWire, HDMI (High-Definition Multimedia Interface), etc.).

In exemplary embodiments, where the application tool 160 is implemented in hardware, the application tool 160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An apparatus for creating modules from a XML schema, the apparatus comprising:
    memory comprising computer-executable instructions; and
    a processor executing the computer-executable instructions, the computer-executable instructions, when executed by the processor, cause the processor to perform operations comprising:
    creating a syntax tree from a sample XML, fragment, wherein the sample XML fragment is an instance of a sample fragment of the XML schema;
    creating a module based on the syntax tree of the sample XML fragment, the module comprising a list of parameters and the syntax tree;
    identifying, on a computer, variable pieces of information in the syntax tree to be inserted in the list of parameters;
    designating in the syntax tree the variable pieces of information with a variable sign to be inserted in the list of parameters, the variable sign is a visible designation of "V" displayed at each of the variable pieces of information, wherein fixed pieces of information are designated with a fixed sign, the fixed sign is another visible designation of "F" displayed at each of the fixed pieces of information, wherein the visible designation "V" of the variable sign is different from the another visible designation "F" of the fixed sign, wherein, prior to designating in the syntax tree the variable pieces of information with the variable sign, each of the variable pieces of information were initially fixed pieces of information designated with the another visible designation "F";
    inserting the variable pieces of information into the list of parameters of the module based on the variable pieces of information having been designated with the variable sign;
    inserting another module in the syntax tree of the module, the another module corresponding to another sample XML fragment of the XML schema and having another list of parameters;
    identifying the another module with the variable sign in the syntax tree of the module;
    inserting the another module designated with the variable sign into the list of parameters of the module in which the another module serves as a parameter; and
    providing an option for constraining the module, wherein constraining the module allows creation of a cloned module by refining the list of parameters of the module already existing without visibly displaying mapping to the sample XML, fragment and without requiring a user to be aware of the mapping to the sample XML fragment.

2. The apparatus of claim 1, wherein constraining the module comprises:
    creating the cloned module as a clone of the module, which includes replicating the syntax tree of the sample XML fragment and replicating the list of parameters of the module as a replicated list of parameters in the cloned module;
    specifying a constraint on at least one parameter in the replicated list of parameters, wherein the constraint includes at least one of removing a requirement of inputting a value for a first variable piece of information, applying a fixed value to a second variable piece of information such that the second variable piece of information becomes fixed, and removing a third variable piece of information from the replicated list of parameters.

3. The apparatus of claim 2, wherein constraining the module further comprises:
    determining that the module is being referenced as a sub-module by different modules in respective syntax trees of the different modules;
    based on determining that the module is being referenced as the sub-module by the different modules, adding the cloned module in a same location in the respective syntax trees of the different modules.

4. The apparatus of claim 2, wherein constraining the module further comprises storing the module as a reference in the cloned module.

5. The apparatus of claim 1, wherein the variable pieces of information are not the variable sign itself, and
    wherein the fixed pieces of information are not the fixed sign itself.

* * * * *